US008259826B2

(12) United States Patent
Yamasuge

(10) Patent No.: US 8,259,826 B2
(45) Date of Patent: Sep. 4, 2012

(54) RECEIVING APPARATUS, COMMUNICATION SYSTEM, RECEIVING METHOD AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 12/273,229

(22) Filed: Nov. 18, 2008

(65) Prior Publication Data

US 2009/0135929 A1 May 28, 2009

(30) Foreign Application Priority Data

Nov. 27, 2007 (JP) ................. 2007-305943

(51) Int. Cl.
*H04K 1/10* (2006.01)
(52) U.S. Cl. ........................ 375/260; 455/502
(58) Field of Classification Search .................. 370/218, 370/342, 389, 412; 375/260
See application file for complete search history.

(56) References Cited

U.S. PATENT DOCUMENTS

| 2003/0153334 A1* | 8/2003 | Hokao | 455/502 |
| 2005/0078648 A1* | 4/2005 | Nilsson | 370/342 |
| 2007/0014271 A1* | 1/2007 | Lai | 370/342 |
| 2007/0014286 A1* | 1/2007 | Lai | 370/389 |
| 2007/0274205 A1 | 11/2007 | Ramasubramanian et al. | |

FOREIGN PATENT DOCUMENTS

| EP | 0 358 582 | 3/1990 |
| GB | 2 059 724 | 4/1981 |
| JP | 2006-108846 | 4/2006 |
| JP | 2006-197375 | 7/2006 |
| JP | 2007-019985 | 1/2007 |
| JP | 2007-19985 | 1/2007 |

OTHER PUBLICATIONS

European Search Report from European Patent Office dated Mar. 30, 2009, Application No. 08253509.7-2415, 7 pages.

* cited by examiner

*Primary Examiner* — Leon-Viet Nguyen
(74) *Attorney, Agent, or Firm* — Finnegan, Henderson, Farabow, Garrett & Dunner, L.L.P.

(57) ABSTRACT

A receiving apparatus according to the present invention has a plurality of synchronizing circuits which is provided corresponding to different preamble signals of a reception signal and operate simultaneously at the time of receiving the preamble signals so as to output synchronous signals, a correlation value comparing section which compares correlation values of the synchronous signals output from the plurality of synchronizing circuits, and a synchronizing section which determines whether the received signal is for the subject apparatus based on a comparison result from the correlation value comparing section.

7 Claims, 6 Drawing Sheets

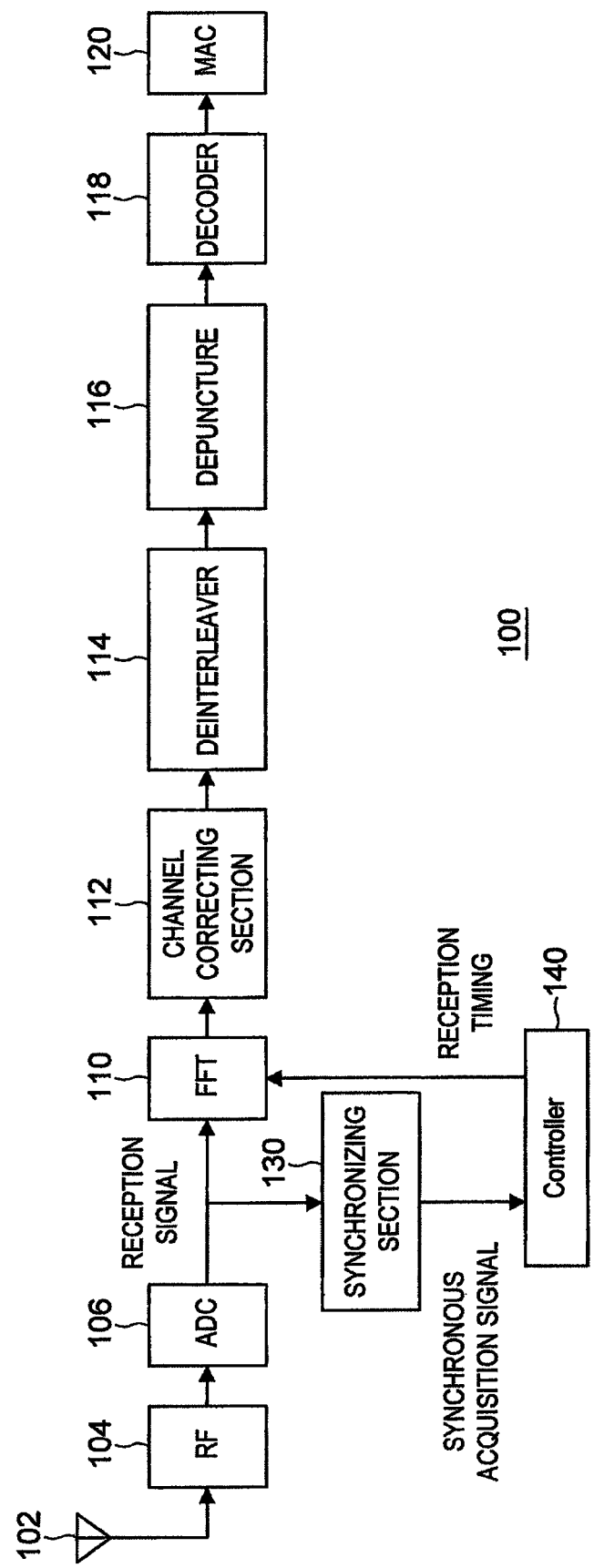

EXAMPLE OF TRANSMISSION PATTERN OF PREAMBLE SIGNAL

RECEIVING APPARATUS, COMMUNICATION SYSTEM, RECEIVING METHOD AND PROGRAM

CROSS-REFERENCE TO RELATED APPLICATION

The present invention contains subject matter related to Japanese Patent Application JP 2007-305943 filed in the Japan Patent Office on Nov. 27, 2007, the entire contents of which being incorporated herein by reference.

BACKGROUND OF THE INVENTION

1. Field of the Invention

The present invention relates to a receiving apparatus, a communication system, receiving method and program.

2. Description of the Related Art

For example, in multi-band OFDM system of UWB, a signal which hops over a plurality of bands is transmitted and received, and a preamble pattern of the signal is set to be different according to TFC patterns representing types of hopping. For example, Japanese Patent Application Laid-Open Nos. 2007-19985 and 2006-197375 disclose a constitution where a plurality of synchronizing circuits corresponding to the TFC patterns are provided.

SUMMARY OF THE INVENTION

On a receiving apparatus side, however, even when a signal with a TFC pattern different from the preset TFC pattern is received, synchronism is occasionally acquired. Particularly when a distance between the receiving apparatus and a transmitting apparatus is short, this issue easily arises. In this case, the receiving apparatus is considered to have acquired the synchronism and receives a signal after preamble. At the time when the receiving apparatus receives a header, a determination is made that the reception signal is not for the subject apparatus based on a header check sequence (HCS) included in the header. For this reason, a useless process is generated until the header is received. A MAC can hardly determine whether an error due to the header check sequence is caused by reception of different TFC or by deterioration of SN or collision of signals. An unnecessary process such as lowering of a reception rate might be executed as a countermeasure against the error.

Japanese Patent Application Laid-Open Nos. 2007-19985 and 2006-197375 disclose the constitution where a plurality of synchronizing circuits according to the TFC patterns is provided. Although the synchronizing circuits can be switched according to the TFC patterns, an issue that synchronism is faultily acquired with a TFC pattern different from that of the subject apparatus at the time of acquiring the synchronism is not assumed.

Therefore, it is desirable to provide new and improved receiving apparatus, communication system, receiving method and program which can accurately determine whether a reception signal is for a subject apparatus at the time of acquiring synchronism of a preamble signal.

According to an embodiment of the present invention, there is provided a receiving apparatus including: a plurality of synchronizing circuits which is provided corresponding to different preamble signals of a reception signal and operates simultaneously at the time of receiving the preamble signals so as to output correlation values of synchronous signals; a correlation value comparing section which compares the correlation values output from the plurality of synchronizing circuits; and a synchronizing section which outputs a synchronism acquisition signal based on a comparison result from the correlation value comparing section.

According to the above constitution, the plurality of synchronizing circuits is provided corresponding to different preamble signals of the reception signal, and operates simultaneously at the time of receiving the preamble signals so as to output correlation values of the synchronous signals. The correlation value comparing section compares the correlation values of the synchronous signals output from the plurality of synchronizing circuits. The synchronizing section outputs a synchronism acquisition signal based on a comparison result from the correlation value comparing section. Therefore, only when the reception signal is for the subject apparatus based on the result of comparing the plurality of correlation values of the synchronous signals, the synchronism acquisition signal can be accurately output.

Further, when a synchronizing circuit which outputs the largest correlation value is a synchronizing circuit corresponding to the preamble signal with a TFC pattern of a subject apparatus based on the comparison result from the correlation value comparing section, the synchronizing section may output the output from the synchronizing circuit as the synchronism acquisition signal. According to such a constitution, only when the received signal is for the subject apparatus based on whether the synchronizing circuit which outputs the largest correlation value is the synchronizing circuit corresponding to the preamble signal with the TFC pattern of the subject apparatus, the synchronism acquisition signal can be output.

Further, when the synchronizing circuit which outputs the largest correlation value is not the synchronizing circuit corresponding to the preamble signal with the TFC pattern of the subject apparatus based on the comparison result from the correlation value comparing section, a receiving process thereafter is halted and the process waits for synchronism by the plurality of synchronizing circuits. According to such a constitution, when the synchronizing circuit which outputs the largest correlation value is not the synchronizing circuit corresponding to the preamble signal with the TFC pattern of the subject apparatus, a determination can be made that a received signal is not for the subject apparatus. For this reason, the receiving process thereafter is halted, so that execution of a useless receiving process can be repressed.

The correlation value comparing section may compare the correlation values output within predetermined time previously defined according to a preamble signal or a TFC pattern. According to such a constitution, since timings at which the synchronism is acquired differs according to preamble signals or TFC patterns, when correlation values output within predetermined time defined according to a preamble signal or a TFC pattern are compared so that the correlation values can be accurately compared.

According to another embodiment of the present invention, there is provided a communication system in which a transmitting apparatus and a receiving apparatus are connected via a wireless communication network, the receiving apparatus including: a plurality of synchronizing circuits which is provided corresponding to different preamble signals of a reception signal and operates simultaneously at the time of receiving the preamble signals so as to output correlation values of synchronous signals; a correlation value comparing section which compares the correlation values output from the plurality of synchronizing circuits; and a synchronizing section which outputs a synchronism acquisition signal based on a comparison result from the correlation value comparing section.

According to the above constitution, in the communication system in which the transmitting apparatus and the receiving apparatus are connected via a wireless communication network, the plurality of synchronizing circuit of the receiving apparatus is provided corresponding to different preamble signals of a reception signal, and operates simultaneously at the time of receiving the preamble signals so as to output correlation values of the synchronous signals. The correlation value comparing section compares the correlation values of the synchronous signals output from the plurality of synchronizing circuits. The synchronizing section outputs the synchronism acquisition signal based on a comparison result from the correlation value comparing section. Therefore, only when the reception signal is for the subject apparatus based on the result of comparing the plurality of correlation values of the synchronous signals, the synchronism acquisition signal can be output accurately.

According to another embodiment of the present invention, there is provided a receiving method including the steps of: outputting correlation values of synchronous signals at the time of receiving preamble signals from a plurality of synchronizing circuits provided corresponding to the different preamble signals of a reception signal; comparing the correlation values output from the plurality of synchronizing circuits; and outputting a synchronism acquisition signal based on a result of comparing the correlation values.

According to the above constitution, the correlation values of the synchronous signals are output from the plurality of synchronizing circuits provided corresponding to different preamble signals of the reception signal at the time of receiving the preamble signals. Further, the correlation values of the synchronous signals output from the plurality of synchronizing circuits are compared, and the synchronism acquisition signal is output based on the result. Therefore, only when the reception signal is for the subject apparatus based on the result of comparing the plurality of correlation values of the synchronous signals, the synchronism acquisition signal can be output accurately.

According to another embodiment of the present invention, there is provided a program which allows a computer to function as: a unit which outputs correlation values of synchronous signals at the time of receiving preamble signals from a plurality of synchronizing circuits provided corresponding to the different preamble signals of a reception signal; a unit which compares the correlation values output from the plurality of synchronizing circuits; and a unit which outputs a synchronism acquisition signal based on a result of comparing the correlation values.

According to the above constitution, the correlation values of the synchronous signals are output from the plurality of synchronizing circuits provided corresponding to different preamble signals of the reception signal at the time of receiving the preamble signals. Further, the correlation values of the synchronous signals output from the plurality of synchronizing circuits are compared, and the synchronism acquisition signal is output based on the result. Therefore, only when the reception signal is for the subject apparatus based on the result of comparing the plurality of correlation values of the synchronous signals, the synchronism acquisition signal can be output accurately.

According to the present invention, at the time of acquiring synchronism of the preamble signals, a determination can be accurately made whether the reception signal is transmitted to the subject apparatus.

BRIEF DESCRIPTION OF THE DRAWINGS

FIG. 1 is a pattern diagram illustrating a constitution of a receiving apparatus according to a first embodiment of the present invention;

DETAILED DESCRIPTION OF THE PREFERRED EMBODIMENTS

Figure 2A:
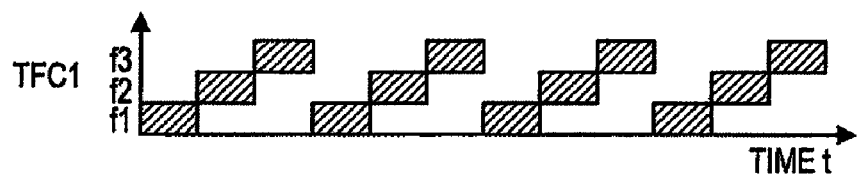
FIGS. 2A to 2G are pattern diagrams illustrating seven TFCs defined by IEEE802.15.3 standard.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a pattern diagram illustrating a constitution of a receiving apparatus 100 according to one embodiment of the present invention. The receiving apparatus 100 is, for example, a receiving apparatus adopting a UWB multi-band OFDM system, and receives a signal transmitted from a transmitting apparatus connected communicably via a wireless communication network. As shown in FIG. 1, the receiving apparatus 100 has an antenna 102, a RF circuit 104, an AD converting section (ADC) 106, an FFT 110, a channel correcting section 112, a deinterleaver 114, a depuncturer 116, a decoder 118, an MAC 120, a synchronizing section 130 and a controller 140.

In FIG. 1, a high-frequency signal received by the antenna 102 is amplified by the RF circuit 104, and is converted into a digital signal by the AD converting section 106. The reception signal converted into the digital signal is subject to fast Fourier transformation by the FFT 110 so as to be transmitted to the channel correcting section 112. The channel correcting section 112 corrects a channel based on a channel estimating signal (CE) included in the reception signal.

The signal which is corrected by the channel correcting section 112 is sent to the deinterleaver 114. The deinterleaver 114 executes a process for returning the interleaved reception signal to an original state. The reception signal output from the deinterleaver 114 is sent to the depuncturer 116 so as to be subject to a depuncture process. The decoder 118 decodes the signal input from the depuncturer 116. The signal decoded by the decoder 118 is input into the MAC 120.

The synchronizing section 130 acquires synchronism of the signals received by the AD converting section 106. The controller 140 sends reception timings of the signals synchronized by the synchronizing section 130 to the FFT 110. The FFT 110 performs the fast Fourier transformation on the signals based on the reception timings sent from the synchronizing section 130.

The OFDM system which carries out frequency hopping, such as the communication system defined by the IEEE802.15.3 standard, is normally called a multi-band OFDM (MB-OFDM) system. This system carries out hopping even for transmission of a preamble signal as a frequency acquisition signal, and has various types of hopping patterns and data transmission patterns (Time Frequency Code: hereinafter, TFC).

FIGS. 2A to 2G are pattern diagrams illustrating seven TFCs defined by the IEEE802.15.3 standard. As shown in FIGS. 2A to 2G, seven patterns TFC1 to TFC7 are defined, and a preamble signal as a synchronous signal is transmitted with any one of the seven patterns. Concretely, three frequencies f1, f2 and f3 are prepared as transmission frequencies, and a preamble signal (synchronous signal) of one unit is sent repeatedly 24 times (24 slots) by using any one of three frequencies f1, f2 and f3. FIGS. 2A to 2G show only 12 cycles.

Figure 2B:
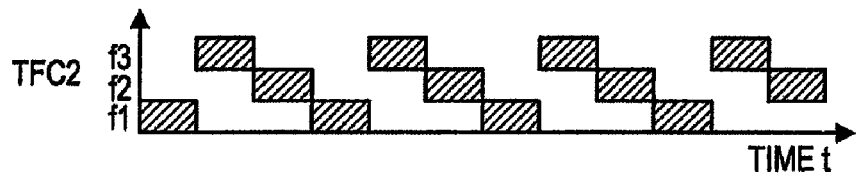
Figure 2C:
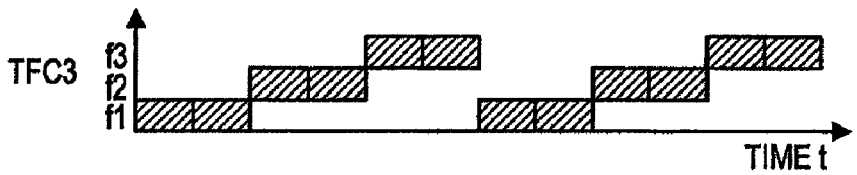
Figure 2D:
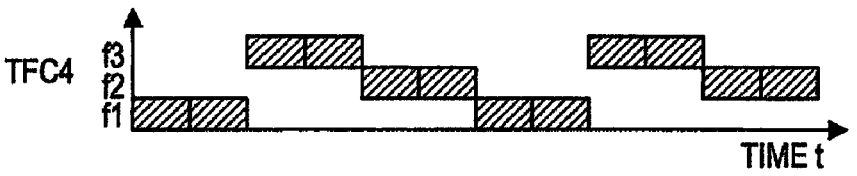
Figure 2E:
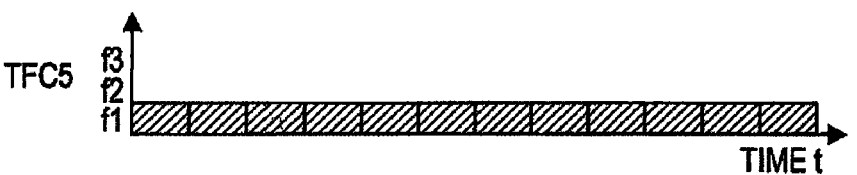
Figure 2F:
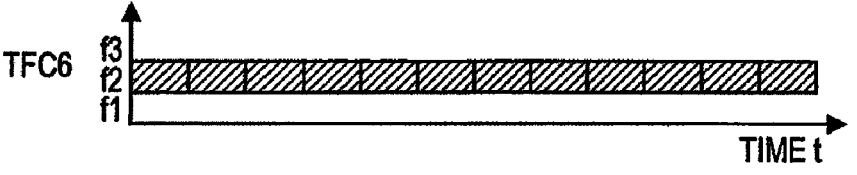
Figure 2G:
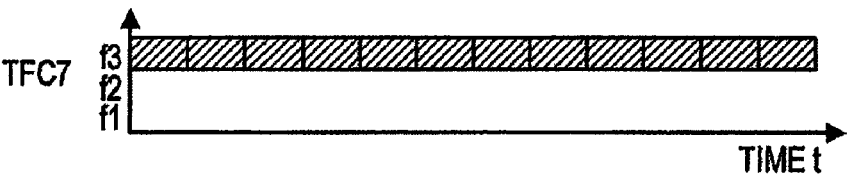

The respective patterns are described. In the pattern TFC1, as shown in FIG. 2A, the frequency is changed into f1, f2 and f3 in this order according to the preamble signal (synchronous signal) of one unit. In the pattern TFC2, as shown in FIG. 2B, the frequency is changed into f1, f3 and f2 in this order according to the preamble signal of one slot. In the pattern TFC3, as shown in FIG. 2C, the frequency is changed into f1, f2 and f3 in this order according to the preamble signals of two slots. In the pattern TFC4, as shown in FIG. 2D, the frequency is changed into f1, f3 and f2 in this order according to the preamble signals of two slots. In the pattern TFC5, as shown in FIG. 2E, the preamble signals of all the slots are transmitted with the frequency f1. In the pattern TFC6, as shown in FIG. 2F, the preamble signals of all the slots are transmitted with the frequency f2. In the pattern TFC7, as shown in FIG. 2G, the preamble signals of all the slots are transmitted with the frequency f3. Not shown here, but signal polarities (+ or −) of the preamble signals are set to predetermined patterns.

Figure 3:
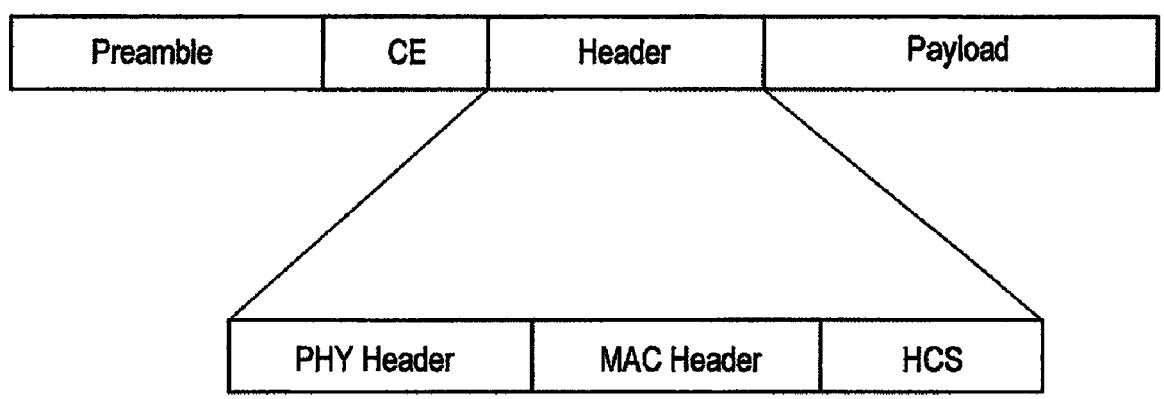
FIG. 3 is a pattern diagram for explaining one example of a data structure of a packet signal received by the receiving apparatus.

FIG. 3 is a pattern diagram illustrating one example of a data structure of a packet signal received by the receiving apparatus 100. As shown in FIG. 3, the packet signal includes a preamble, a channel estimating signal (CE), a header and a payload. The header is classified into a PHY header, a MAC header and a header check sequence (HCS). The PHY header includes information such as a payload transmission rate and a payload length. On the other hand, the MAC header includes a MAC address showing destination of the packet signal. Different preambles are set according to the preamble patterns TFC1 to TFC7 shown in FIGS. 2A to 2G. When the receiving apparatus 100 acquires synchronism of preamble signals, it can recognize the TFC patterns of the reception signals as the TFC pattern corresponding to the subject apparatus.

At this time, when, for example, the setting is such that the receiving apparatus 100 receives the signal of TFC1, it occasionally acquires synchronism due to the reception of the other signals of TFC2 to TFC7. In this case, the receiving apparatus 100 can determine reception of the other signals of TFCs by means of HCS after the MAC header, but it determines that the reception signal is a signal for the subject apparatus until receiving the HCS of the header. For this reason, although originally the determination can be made that the reception signal is not a signal for the subject apparatus at the time of receiving the preamble, signals from the preamble to the HCS are decoded, and thus an unnecessary process is executed.

Figure 4:
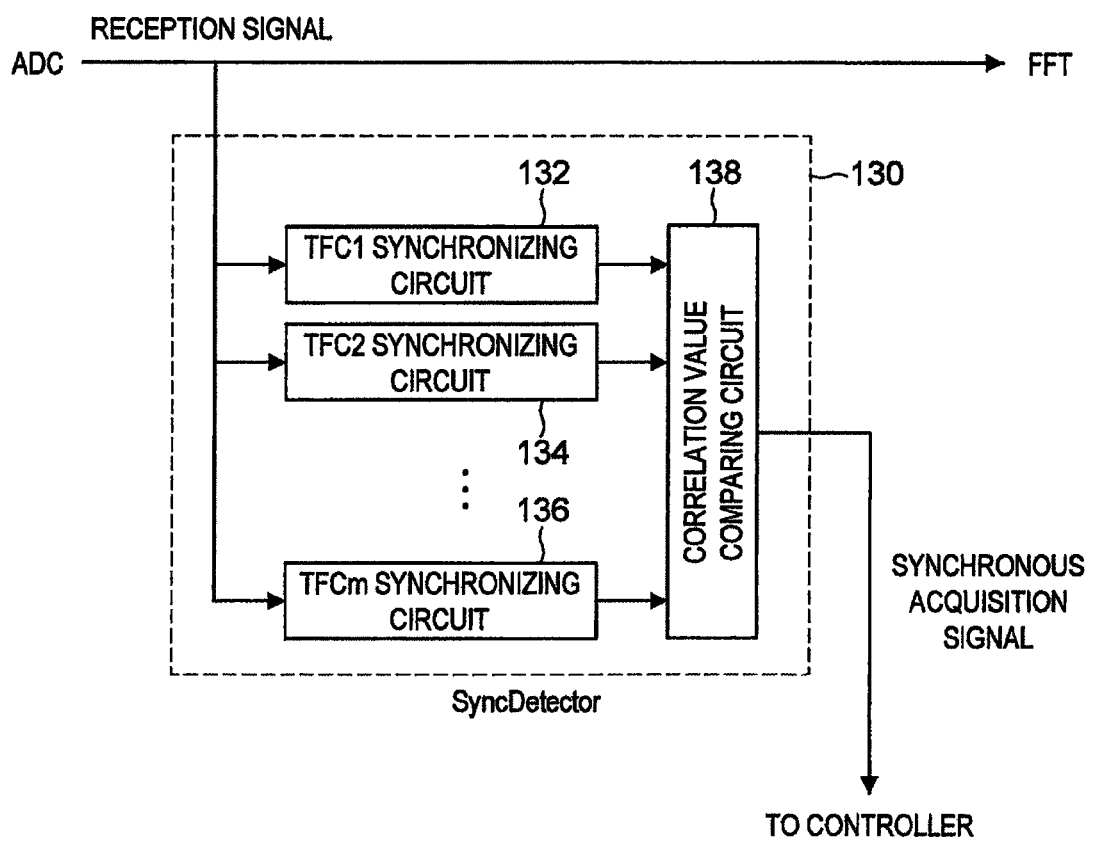
FIG. 4 is a pattern diagram illustrating in detail a constitution of a synchronizing section.

For this reason, in the receiving apparatus 100 according to this embodiment, a plurality of synchronizing circuits is provided to the synchronizing section 130 so that it can be determined accurately whether the TFC of the reception signal is for the subject apparatus. FIG. 4 is a pattern diagram illustrating in detail a constitution of the synchronizing section 130. As shown in FIG. 4, the synchronizing section 130 has a TFC1 synchronizing circuit 132, a TFC2 synchronizing circuit 134, and possible additional synchronizing circuits through a TFCm synchronizing circuit 136. Further, the synchronizing section 130 has a correlation value comparing circuit 138 which compares correlation values output from the synchronizing circuits 132, 134 and 136.

The TFC1 synchronizing circuit 132 acquires synchronism at the time of receiving a TFC1 reception signal, and acquires a correlation value of the synchronous signal. Similarly, the TFC2 synchronizing circuit 134 acquires synchronism at the time of receiving a TFC2 reception signal and outputs a correlation value. The TFCm synchronizing circuit 136 acquires synchronism at the time of receiving a TFCm reception signal and outputs a correction value.

Figure 5:
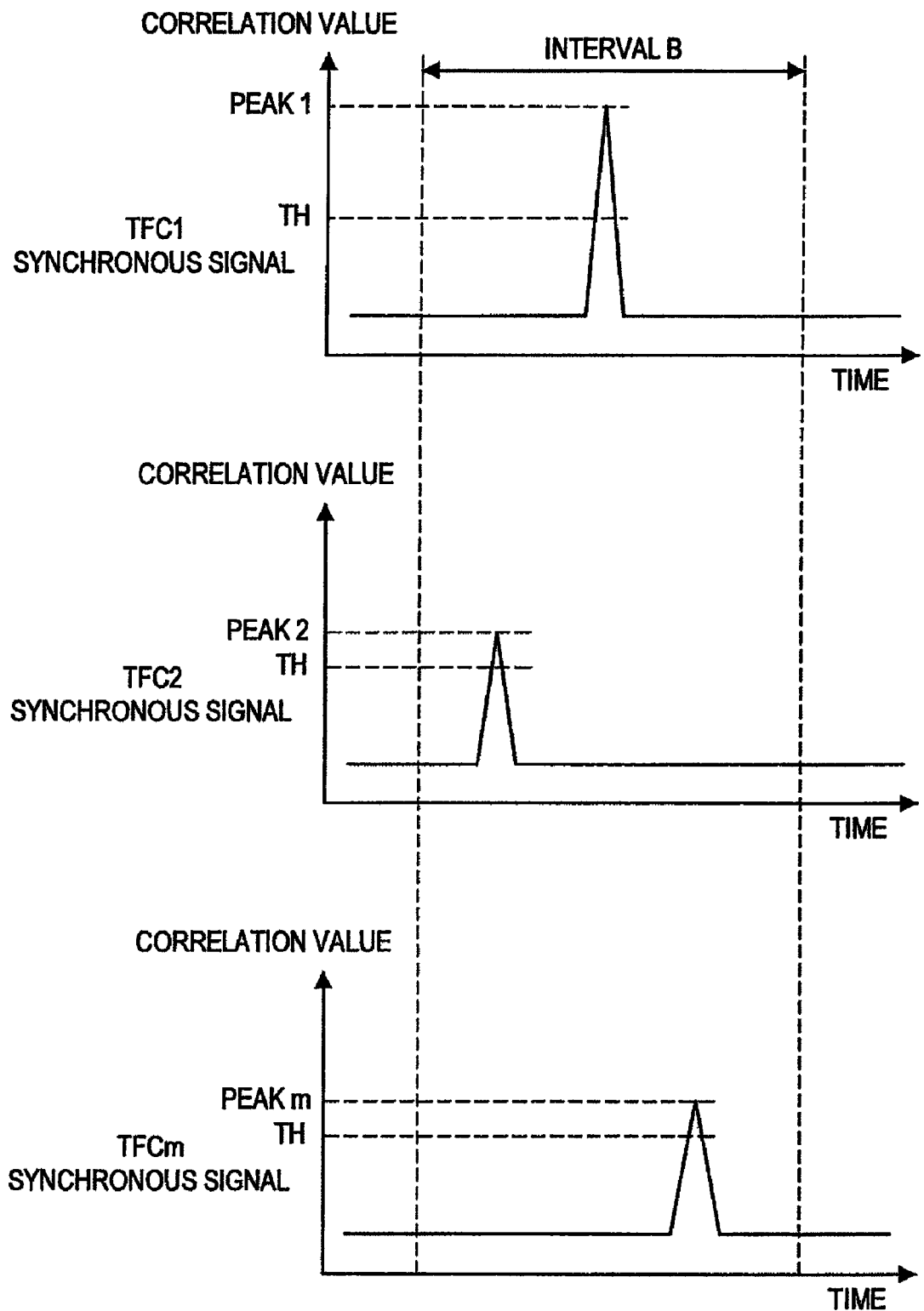
FIG. 5 is a pattern diagram illustrating correlation values of synchronous signals output from the synchronizing circuits when the receiving apparatus receives a reception signal of TFC1.

FIG. 5 is a pattern diagram illustrating correlation values of the synchronous signals output from the synchronizing circuit 132, 134 and 136 when the receiving apparatus 100 receives a TFC 1 reception signal. The synchronizing circuits operate simultaneously at the time of receiving signals. As shown in FIG. 5, when the receiving apparatus 100 receives a TFC1 reception signal, the TFC1 synchronizing circuit 132 detects a correlation value of a peak value 1. On the other hand, correlation values of synchronous signals detected by the synchronizing circuits 134 and 136 (peak value 2 and peak value m) become smaller than the correlation value detected by the TFC1 synchronizing circuit 132.

The synchronizing circuits 132, 134 and 136 acquire synchronism when the correlation values exceed a threshold TH. As shown in FIG. 5, however, when the correlation values output from the synchronizing circuits 132, 134 and 136 exceed the threshold TH, a determination may not be made as to with which TFC pattern the synchronism is acquired.

For this reason, in the receiving apparatus 100 according to the embodiment, the correlation value comparing circuit 138 compares correlation values detected by the synchronizing circuits 132, 134 and 136, and the synchronizing circuit which outputs the largest correlation value is specified. As a result, a determination is made as to which one of TFC1 to TFC7 signals is received. In the example of FIG. 5, since the correlation value acquired by the TFC1 synchronizing circuit 132 is larger than the correlation values acquired by the other synchronizing circuits 134 and 136, a determination can be made that the synchronizing circuit with the largest correlation value is the synchronizing circuit 132 corresponding to TFC1. As a result, a determination can be securely made that the reception signal is a TFC1 pattern. Therefore, a determination can be made whether the reception signal is a TFC pattern for the subject apparatus or a TFC pattern for another apparatus at the time of receiving payload. As a result, when the signals for the other apparatuses are received, the receiving process can be halted immediately, and thus execution of an useless process can be repressed.

As to the comparison of correlation values, not only correlation values at the same time but also correlation values acquired in a predetermined interval B as shown in FIG. 5 are compared. The interval B is set according to a preamble signal, a hopping pattern and the like. This is because the timings at which the correlation values are detected differ according to variations of the preamble patterns, the TFC patterns or the hopping patterns.

Figure 6:
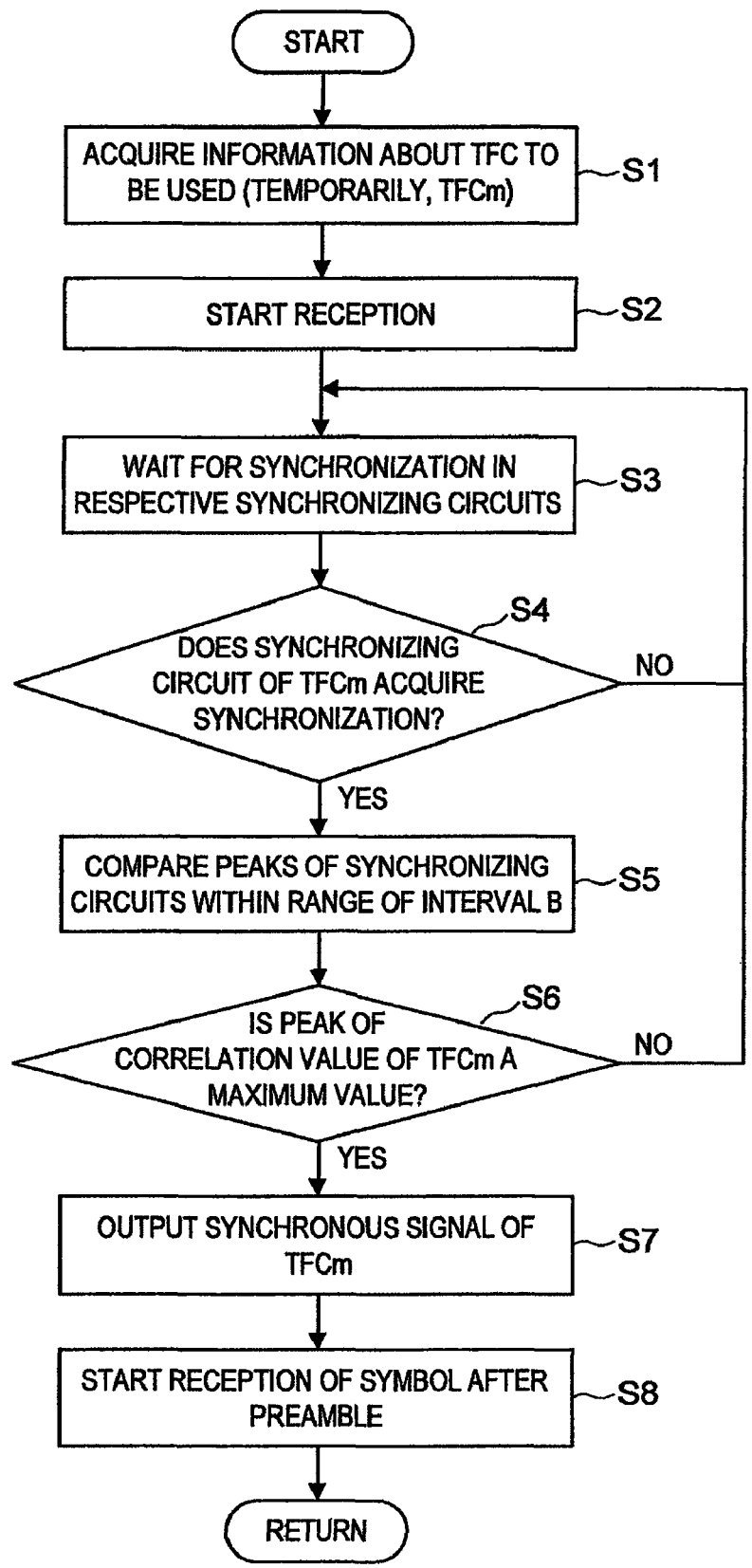
FIG. 6 is a flow chart illustrating a procedure of a process in the receiving apparatus according to the embodiment.

A procedure of a process in the receiving apparatus 100 according to the embodiment is described below with reference to FIG. 6. Information about which one of TFC 1 to TFC7 is used by the receiving apparatus 100 is acquired at step S1. For example, a user can set in advance TFC which is used by the receiving apparatus 100. The signal of the TFCm pattern which is to be used by the receiving apparatus 100 is set in advance.

Reception is started at a next step S2. As a result, the reception signal which is digitally converted by the AD converting section 106 is sent to the synchronizing section 130. All the synchronizing circuits 132, 134 and 146 are actuated and wait for synchronism at a step S3.

At a next step S4, when the synchronizing circuit 136 corresponding to TFCm used by the receiving apparatus 100 acquires synchronism, namely, the correlation value detected by the synchronizing circuit 136 is larger than the threshold TH, the process goes to a step S5. On the other hand, when it does not acquire synchronism, the process returns to the step S3. Peaks of the correlation values of the synchronizing circuits 132, 134 and 136 are compared within the range of the interval B at the step S5. At a step S6, a determination is made based on the comparison result at step S5. And when the correlation value of the TFCn synchronizing circuit 136 is the maximum, the process goes to a step S7. At the step S7, an output from the TFCn synchronizing circuit 136 is output as a final synchronism acquisition signal from the synchronizing section 130 so as to be sent to the controller 140. As a result, the reception timing due to the synchronism acquisition is sent to the FFT 110, and the reception signal is subject to the fast Fourier Transformation. At a next step S8, reception of a symbol such as a header after a preamble. After step S8, the TFC determining process is ended (RETURN).

On the other hand, when the correlation value of the TFCm synchronizing circuit is not maximum at the step S6, it is determined that another TFC other than TFCm is received, and the process returns to the step S3 so that the process thereafter is repeated. According to the above process, the determination can be accurately made whether the TFC pattern of the reception signal is the TFC pattern to be used by the receiving apparatus 100. The process in FIG. 6 may be realized by allowing the receiving apparatus 100 as a computer to function according to a program (software) stored in a memory of the receiving apparatus 100, for example.

According to this embodiment, the synchronizing circuits 132, 134 and 36 corresponding to a plurality of TFCs are provided, and the correlation values detected by the synchronizing circuits 132, 134 and 136 are compared so that the TFC pattern of the reception signal can be securely recognized. Therefore, the determination can be accurately made based on the TFC pattern whether the reception signal is a signal for the subject apparatus or for another apparatus.

It should be understood by those skilled in the art that various modifications, combinations, sub-combinations and alternations may occur depending on design requirements and other factors insofar as they are within the scope of the appended claims or the equivalents thereof.

What is claimed is:

1. A receiving apparatus comprising:
a plurality of synchronizing circuits which is provided corresponding to different preamble signals of a reception signal and operates simultaneously at the time of receiving the preamble signals so as to output correlation values of synchronous signals;
a correlation value comparing section which compares the correlation values output from the plurality of synchronizing circuits; and
a synchronizing section which outputs a synchronism acquisition signal based on a comparison result from the correlation value comparing section;
wherein an initial time-frequency code (TFC) pattern used by the receiving apparatus for comparing correlation values is set in advance; and
wherein the reception signal is subject to fast Fourier Transformation only when the synchronism acquisition signal indicates that one of the preamble signals of the reception signal correlates to the initial TFC pattern.

2. The receiving apparatus according to claim 1, wherein when a synchronizing circuit which outputs the largest correlation value is a synchronizing circuit corresponding to the preamble signal with a TFC pattern of a subject apparatus based on the comparison result from the correlation value comparing section, the synchronizing section outputs the output from the synchronizing circuit as the synchronism acquisition signal.

3. The receiving apparatus according to claim 2, wherein when the synchronizing circuit which outputs the largest correlation value is not the synchronizing circuit corresponding to the preamble signal with the TFC pattern of the subject apparatus based on the comparison result from the correlation value comparing section, a receiving process thereafter is halted and the process waits for synchronism by the plurality of synchronizing circuits.

4. The receiving apparatus according to claim 1, wherein the correlation value comparing section compares the correlation values output within predetermined time previously defined according to a preamble signal or a TFC pattern.

5. A communication system in which a transmitting apparatus and a receiving apparatus are connected via a wireless communication network, the receiving apparatus comprising:
a plurality of synchronizing circuits which is provided corresponding to different preamble signals of a reception signal and operates simultaneously at the time of receiving the preamble signals so as to output correlation values of synchronous signals;
a correlation value comparing section which compares the correlation values output from the plurality of synchronizing circuits; and
a synchronizing section which outputs a synchronism acquisition signal based on a comparison result from the correlation value comparing section;
wherein an initial time-frequency code (TFC) pattern used by the receiving apparatus for comparing correlation values is set in advance; and
wherein the reception signal is subject to fast Fourier Transformation only when the synchronism acquisition signal indicates that one of the preamble signals of the reception signal correlates to the initial TFC pattern.

6. A receiving method comprising the steps of:
outputting correlation values of synchronous signals at the time of receiving preamble signals from a plurality of synchronizing circuits provided corresponding to the different preamble signals of a reception signal;
comparing the correlation values output from the plurality of synchronizing circuits; and
outputting a synchronism acquisition signal based on a result of comparing the correlation values;
wherein an initial time-frequency code (TFC) pattern used by the receiving apparatus for comparing correlation values is set in advance; and
wherein the reception signal is subject to fast Fourier Transformation only when the synchronism acquisition signal indicates that one of the preamble signals of the reception signal correlates to the initial TFC pattern.

7. A non-transitory computer-readable medium for causing a computer to function as:
a unit which outputs correlation values of synchronous signals at the time of receiving preamble signals from a plurality of synchronizing circuits provided corresponding to the different preamble signals of a reception signal;

a unit which compares the correlation values output from the plurality of synchronizing circuits; and
a unit which outputs a synchronism acquisition signal based on a result of comparing the correlation values;
wherein an initial time-frequency code (TFC) pattern used by the receiving apparatus for comparing correlation values is set in advance; and
wherein the reception signal is subject to fast Fourier Transformation only when the synchronism acquisition signal indicates that one of the preamble signals of the reception signal correlates to the initial TFC pattern.

* * * * *